United States Patent Office 3,709,904
Patented Jan. 9, 1973

1

3,709,904
AMINOETHYLATION REACTION AND
PRODUCTS THEREOF
Donald A. Tomalia and Narayanlal D. Ojha, Midland,
Mich., assignors to The Dow Chemical Company, Midland, Mich.
No Drawing. Filed June 18, 1969, Ser. No. 834,562
Int. Cl. C07d 85/36
U.S. Cl. 260—307 F                                    5 Claims

ABSTRACT OF THE DISCLOSURE

An aminoethyl derivative of a primary or secondary alcohol is prepared in the reaction between (1) a primary or secondary alcohol and (2) a molecular complex of $SO_2$ and an aziridine having the structural formula

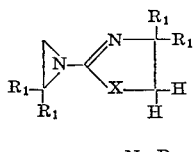

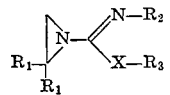

or

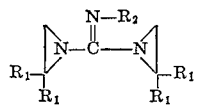

wherein $R_1$–$R_3$ are inert hydrocarbon radicals and X is oxygen or sulfur. The aminoethylated reaction products, after the $SO_2$ is removed, contain basic amino groups and are useful in neutralizing acids, abstracting acidic gases from flue gas, and as curing agents for epoxy resins.

BACKGROUND OF THE INVENTION

Aziridine (ethylenimine,

and aziridine derivatives are generally classified as being either an "activated" or a "basic" azirdine, the distinction between the two classes being their reactivity towards a nucleophile, such as an amine or an iodide ion. The "activated" aziridines are typically more reactive than the "basic" aziridines with nucleophiles. This class distinction is well known, as illustrated by the references (1) G. E. Ham, J. Organic Chem., 29, 3052 (1964); (2) "Basic Building Blocks—Dow Aziridine Derivatives" (Dow product bulletin-form number 125–1033–68) pp. 12–16.

The subject invention relates to a particular group of "activated" azirdines which are defined below.

Various attempts have been previously made by others to catalyze the reaction between alcohols and certain activated aziridines, cf. (1) Y. Iwakura et al., J. Organic Chem., 26, 4384 (1961) wherein diethylamine, water and a solvent were used to hasten the reaction; (2) "Basic Building Blocks—Dow Aziridine Derivatives," p. 14 wherein a protic acid ($H_2SO_4$) was used to catalyze the reaction between methanol and ethyl N-aziridinylformate,

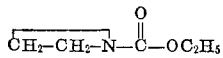

and (3) V. Harder et al., Berichte, 97, 510 (1964) wherein $BF_3$ or $BF_3$·etherate is used as the catalyst. The disadvantages inherent in the above catalyst systems were, respectively, (1) the reaction rate remained quite low and the diethylamine and water were contaminants, (2) protic acids did indeed speed up the reaction to an economically acceptable reation rate but several by-products were produced which decreased the product yield, and (3) $BF_3$ is not an acceptable catalyst for all cases since it attacks and degrades the alcoholic reactants in many instances, e.g., ethylene glycol and α-phenethyl alcohol, thus giving poor yields and contaminated products. $BF_3$ is also known to cause polymerization of aziridines which further reduces the product yields and contaminates the desired product.

SUMMARY OF THE INVENTION

It has now been discovered that novel aminoethylated derivatives of primary and secondary alcohols are prepared in the novel reaction which comprises reacting by contacting (1) a primary or secondary alcohol with (2) a molecular complex of sulfur dioxide, $SO_2$, and an activated aziridine compound having the structural formula

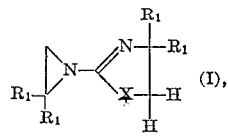

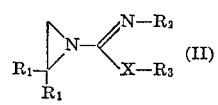

or

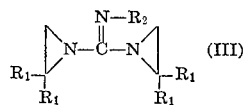

wherein each $R_1$ is independently hydrogen of alkyl having 1 to about 4 carbon atoms; $R_2$ is aryl or an aryl group bearing inert substituents such as halo, nitro, cyano, alkoxy or alkyl; $R_3$ is alkyl or $R_2$; and X is oxygen or sulfur. The aminoethylated reaction products, after the $SO_2$ is removed, contain basic amino groups and are useful in neutralizing acids, abstracting acidic gases from flue gas, and in curing epoxy resins. The reaction products are obtained in high yield and purity.

The reaction and the structural formula for the novel aminoethylated reaction products may be illustrated as follows:

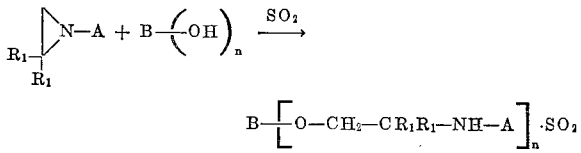

$$B-\left[O-CH_2-CR_1R_1-NH-A\right]_n \cdot SO_2$$

In the product formula, B—O— is the residue of an aliphatic hydroxy-containing compound derived by any abstraction of hydrogen from a hydroxy-containing compound within the class of aliphatic primary and secondary alcohols defined below; $R_1$ has the above meaning; A is

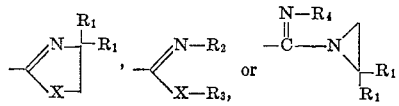

wherein $R_1$, $R_2$, $R_3$ and $R_4$ are as defined above; and $n$ is an integer of at least 1 and may be equal to or less than the number of hydroxy groups on a polyhydroxy-containing reactant.

Suitable aziridine reactants in the subject process have the above structural Formulae I, II and III and include 2-(1-aziridinyl)-2-oxazoline,
2-(1-aziridinyl)-2-thiazoline,
2-(2-ethyl-1-aziridinyl)-4-ethyl-2-oxazoline, 2-(2,2-dimethyl-1-aziridinyl)-4,4-dimethyl-2-oxazoline,
2-(2,2-dipropyl-1-aziridinyl)-4,4-dipropyl-2-thiazoline,
methyl N-phenyl-1-aziridinecarboximidate,
n-butyl N-phenyl-1-aziridinecarboximidate,
ethyl N-m-nitrophenyl-1-aziridinecarboximidate,
propyl N-p-bromophenyl-1-aziridinecarboximidate,
isobutyl N-p-butylphenyl-1-aziridinecarboximidate,
ethyl N-phenyl(2,2-dimethyl-1-aziridinyl) carboximidate,
methyl N-phenyl-1-aziridinecarboximidothioate,
1,1'-(((m-nitrophenyl)imino)methylene)bisaziridine,
1,1'-(((p-bromophenyl)imino)methylene)bisaziridine, and other like compounds.

Suitable primary and secondary alcohols in the instant process include aliphatic alcohols which may be straight-chained, branched or cyclic, saturated or unsaturated, and which may bear inert substituents, i.e., substituents which do not react in the process. Alcohols in this process may contain one or more hydroxy groups. Therefore, suitable alcohols include: the alkanols having typically 1 to about 20 carbon atoms, such as methanol, ethanol, n- and isopropanol, n- and isobutanol, cyclohexanol, dodecanol, hexadecanol; the alkenols having 3 to about 20 carbon atoms, such as allyl alcohol, crotyl alcohol, cyclohexanol, methylvinylcarbinol, 1,4-but-2-enediol; the alkynols having 3 to about 20 carbon atoms, such as propargyl alcohol, 1,4-but-2-yne diol; the aliphatic polyols, such as ethylene, propylene and butylene glycol, glycerol, pentaerythritol, carbohydrates, e.g., dextrose and sucrose, starch, cellulose, sterols, polyvinyl alcohol; and other like compounds.

The hydrocarbon chains of suitable alcohols may be interupted by divalent radicals of oxygen or sulfur. Hence, suitable alcohols include polyalkylene glycols, such as polyethylene, polypropylene and polybutylene glycols, and polyalkylene sulfides, such as polyepisulfide, and-derivatives of such compounds, such as the alkyl or aryl monoethers of polyethylene, polypropylene and polybutylene glycols, and polyepihalohydrins, e.g., polyepichlorohydrin, and oxyalkylated polyols made by condensing alkylene oxides with any of the above hydroxy compounds.

The reaction is advantageously conducted in an inert liquid medium or in the presence of an excess of liquid $SO_2$ or alcohol, and is preferably conducted in liquid $SO_2$. Accordingly, the reaction temperature and pressure are preferably selected so as to maintain any excess $SO_2$ in substantially a liquid phase.

Most of the subject reactions occur at satisfactory reaction rates between about $-15°$ C. and about $50°$ C., and $-15°$ to $50°$ C. is therefore the currently preferred temperature range, but temperatures up to the critical temperature of $SO_2$ may be used.

At temperatures below about $-10°$ C., $SO_2$ is normally liquid and atmospheric pressure is convenient and therefore preferred. At higher temperatures, superatmospheric at least equal to the autogenous pressure is preferable.

The reaction time will vary with the reactivity of specific reactants in the process. Accordingly, the reactants should be maintained in intimate contact until the reaction product is formed. Typically a suitable reaction time is between a few minutes and 24 hours.

Substantially anhydrous conditions are preferred since water reacts with $SO_2$ and competing side reactions occur.

In the subject process, the molar ratio of $SO_2$ to activated aziridine should be at least 1:1 and an excess of $SO_2$ is preferred. The ratio of aziridine equivalents to hydroxy equivalents is not critical; however, for reasons of economy and convenience in purifying the reaction product, a ratio between 1:10 and 10:1 of such reactants is typically used. For the reactions using a lower molecular weight alcohol reactant, such as methanol or ethylene glycol, an excess of alcohol is preferred, and for the reactions involving a higher molecular weight alcohol, such as those alcohols having a molecular weight of about 200 or higher, a stoichiometric ratio of reactants or slight excess of aziridine is preferred.

The complexes formed between $SO_2$ and compounds of Formulas I, II, and III are new compositions which are chemical intermediates which are useful in the subject reaction.

The novel complexes formed between $SO_2$ and the aminoethylated reaction products are useful in the preparation of the corresponding novel free amino compounds having the stated utilities.

$SO_2$ can be removed from the subject complexes, if desired, by (1) heating the complexes under reduced pressure; (2) displacing the $SO_2$ with a protic acid to form the acid-amine salt and thereafter neutralizing the salt with an inorganic base, or (3) by passing the complexes through a column containing an ion exchange resin which is capable of displacing the $SO_2$ to form the free amine product.

SPECIFIC EMBODIMENTS

The following examples further illustrate the invention:

EXAMPLE 1

Ring opening of 2(1-aziridinyl)-2-oxazoline-$SO_2$ complex with methanol

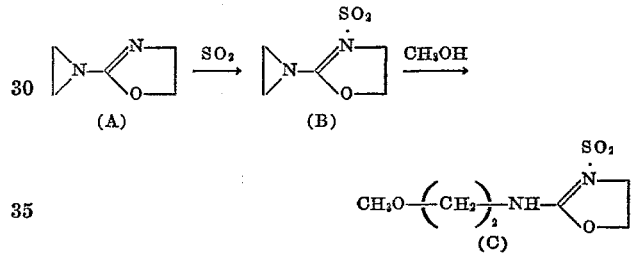

Under substantially anhydrous conditions, 2-(1-aziridinyl)-2-oxazoline (1.0 g.) was added dropwise into 20 ml. of liquid sulfur dioxide. An NMR spectrum of the pale yellow solution indicated that the aziridine (A) had been converted to the $SO_2$ complex (B). This solution was added to 35 ml. of anhydrous methanol and allowed to stand overnight at room temperature. Excess methanol was removed under vacuum, leaving a somewhat viscous liquid residue. NMR analysis of this residue revealed complete loss of the aziridine proton signal and the appearance of a new singlet at $-3.17$ p.p.m. in hexadeuterodimethyl sulfoxide solvent ($d_6$-DMSO) characteristic of $CH_3O-$ groups. This NMR spectrum was essentially identical to a sample of 2-(2-methoxyethylamino)-2-oxazoline (C), which was prepared by the reaction of 1,3-bis(2-chloroethyl) urea with an equivalent amount of sodium methoxide in methanol.

For purposes of comparison, a sample of (A) was allowed to stand in excess methanol overnight under the same conditions as previously described. NMR analysis indicated that no reaction had occurred.

EXAMPLE 2

Ring opening of N-(m-nitrophenyl)-1-aziridine carboximidic acid methyl ester with methanol

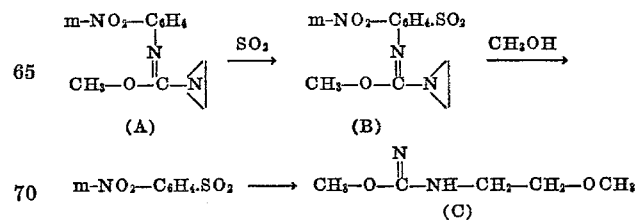

Aziridine (A) (0.05 g.) was placed in a small tube. Under anhydrous conditions, 1 ml. of $SO_2$ was condensed into the tube (Dry Ice cooling). An NMR spectrum of this sample revealed that about 20% of (B)

and about 80% of (A) were present in the mixture at −20° C. This solution was added to 5 ml. of methanol and allowed to stand overnight at room temperature. After removing excess methanol, the residue was dissolved in d₆-DMSO and analyzed by NMR spectroscopy. Its NMR spectrum was consistent with product (C). The absence of aziridine protons indicated that the transformation of (A) to (C) was complete.

Control experiment

A sample of (A), (0.2 g.) in 5 ml. of methanol was allowed to stand at room temperature for 42 hours. No detectable amounts of ring opened product were observed after this time.

EXAMPLE 3

Ring opening of 1,1'-bis N-(m-nitrophenyl formimidoyl aziridine with methanol

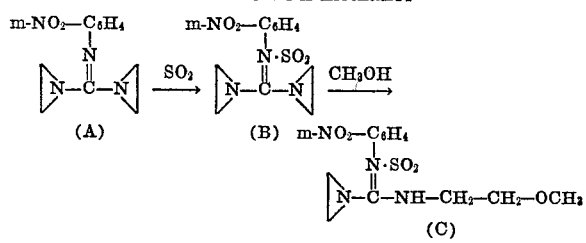

Aziridine (A), 0.05 g., was placed in a small tube, into which 1 ml. of SO₂ was condensed. An NMR spectrum of this sample indicated that (A) was completely transformed to (B). This solution of (B) was added to 5 ml. of anhydrous methanol and allowed to stand overnight at room temperature. Removal of excess methanol gave a residue which was dissolved in d₆-DMSO and analyzed by NMR spectroscopy. The residue consisted largely of the expected ring opened product (C).

Control experiment

A sample of bis-aziridine (A) was allowed to stand in excess methanol at room temperature for 72 hours. Compound (A) was recovered totally unchanged.

EXAMPLE 4

Ring opening of N1(m-nitrophenyl)-1-aziridine carboximidic acid methyl ester with isopropanol

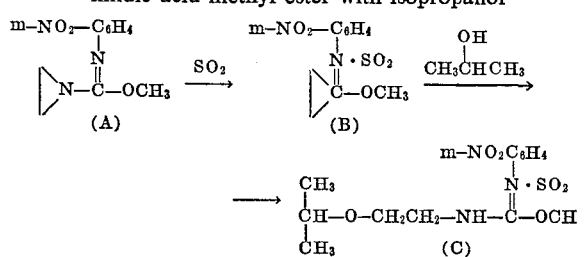

Aziridine (A) (0.5 g., 0.0023 mole) was placed in flask containing 25 ml. of liquid SO₂ giving (B). Isopropanol (5 ml.) was added and the mixture allowed to reflux for about 3 hours. 15 ml. of CCl₄ was added and the mixture was allowed to react overnight at room temperature with stirring. Removal of excess isopropanol and CCl₄ gave 0.79 g. of (C). (C) was a light yellow material which solidified upon standing and was soluble in ether. NMR confirmed the structure.

The free amine products of Examples 1, 2, 3 and 4 are curing agents for epoxy resins under known conditions for curing epoxides, i.e., mixing between about 0.25 to 1 part by weight curing agent per part epoxide resin and heating the mixture, e.g., at 200° C., until cure is effected.

We claim:

1. An aminoethylated derivative of an aliphatic hydroxy-containing compound, said derivative having the structural formula

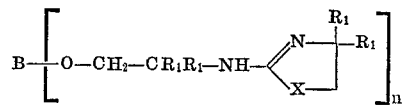

wherein:

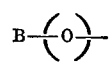

is the n-valent residue of an alkylene glycol of from 2 to 4 carbon atoms which is derived by abstraction of n-atoms of hydrogen from said alkanol or alkylene glycol; X is oxygen or sulfur; $R_1$ is hydrogen or alkyl of from 1 to 4 carbon atoms; and $n$ is an integer of at least 1 and is equal to or less than the number of hydroxy groups on said alkanol or alklene glycol.

2. The aminoethylated derivative defined in claim 1 wherein X is oxygen.

3. A molecular complex of SO₂ with the aminoethylated derivative defined in claim 1.

4. The aminoethylated derivative as defined in claim 1 wherein each $R_1$ is hydrogen.

5. The compound defined by claim 1 wherein each $R_1$ is hydrogen; X is oxygen; and B is methyl.

References Cited

UNITED STATES PATENTS 2,345,208   3/1944   Mathes _____ 260—302

ALEX MAZEL, Primary Examiner

R. V. RUSH, Assistant Examiner

U.S. Cl. X.R.

260—2 N, 239 E, 306.7, 564 E

UNITED STATES PATENT OFFICE
CERTIFICATE OF CORRECTION

Patent No. 3,709,904          Dated January 9, 1973

Inventor(s)  Donald A. Tomalia and Narayanlal D. Ojha

It is certified that error appears in the above-identified patent and that said Letters Patent are hereby corrected as shown below:

Col. 1, line 42, the formula should read as follows:

--- 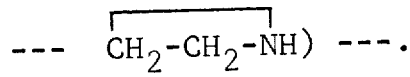 ---.

Col. 2, line 54, delete "any" and insert ---the---.

Col. 5, line 16, delete "N-(m-nitrophenyl formimidoyl" and insert ---N-(m-nitrophenyl)formimidoyl---.

Col. 6, line 29, following "residue of an" insert ---alkanol of from 1 to 20 carbon atoms or an---.

Signed and sealed this 18th day of December 1973.

(SEAL)
Attest:

EDWARD M. FLETCHER, JR.          RENE D. TEGTMEYER
Attesting Officer                Acting Commissioner of Patents